US006426635B1

United States Patent
Nussbaum

(10) Patent No.: US 6,426,635 B1
(45) Date of Patent: Jul. 30, 2002

(54) GALVANOMETER POSITION DETECTOR

(75) Inventor: Michael B. Nussbaum, Newton, MA (US)

(73) Assignee: GSI Lumonics, Inc., Watertown, MA (US)

( * ) Notice: Subject to any disclaimer, the term of this patent is extended or adjusted under 35 U.S.C. 154(b) by 0 days.

(21) Appl. No.: 09/475,464

(22) Filed: Dec. 30, 1999

(51) Int. Cl.⁷ .......................... G01R 27/26; G08C 19/10
(52) U.S. Cl. .................. 324/686; 324/658; 340/870.37
(58) Field of Search .............................. 324/76.11, 176, 324/658, 686; 340/870.37

(56) References Cited

U.S. PATENT DOCUMENTS

| 4,142,144 A | 2/1979 | Rohr .......................... 324/61 |
| 5,537,109 A | 7/1996 | Dowd ................... 340/870.37 |

FOREIGN PATENT DOCUMENTS

GB  2 264 784 A  8/1993

*Primary Examiner*—N. Le
*Assistant Examiner*—Anjan K Deb
(74) *Attorney, Agent, or Firm*—Cesari and McKenna, LLP

(57) ABSTRACT

A capacitive sensing system for detecting the angular position of a rotatable member of a motor. The position detection system includes a cylindrical excitation pin attached to the housing of the motor and a tubular signal plate, having a plurality of sensing surfaces symmetrically arranged about the axis of rotation of the rotatable member, which surrounds the cylindrical excitation pin and, which is also attached to the motor housing. A lobed dielectric is attached to the rotatable member of the motor and inserted between the cylindrical excitation pin and the tubular signal plate. An electric circuit connected to the sensing surfaces of the tubular signal plate calculates the relative angular position of the rotatable member from the amount of energy detected at each of the sensing surfaces.

11 Claims, 6 Drawing Sheets

GALVANOMETER POSITION DETECTOR

BACKGROUND OF THE INVENTION

The present invention relates generally to devices capable of determining the angular position of a moving element and more particularly to position detectors for accurate detection, measurement and control of the angular position of a galvanometer.

Precision measurements and control of the angular position of a rotating element, such as a shaft in a limited-rotation motor, are often required. For example, galvanometers used for electronic manufacturing and repair operations, in which a laser beam is directed to perform tasks such as the profiling, marking cutting, drilling, and trimming of silicon, require high speed position sensors, which must detect the angular position of the rotor with great accuracy and repeatability, high temperature stability, and high signal to noise ratio. To enable high speeds of operation, these sensors must be small in size and have low inertia.

In the field of galvanometers, the precision requirements for angular position detection may be one part in one thousand or even one part in one million, depending upon the application. Presently, there are a number of different approaches used for sensing and detecting rotary motion and position of galvanometers including variable differential transformers, variable potentiometers, light detection systems, other optical devices, and capacitance sensing systems. Many of these detectors are acceptable for some types of uses but have drawbacks associated therewith or are unsatisfactory for other types of uses. The present invention relates to capacitance sensing devices.

The prior art primarily uses two types of capacitive position detectors. The first design includes a rotor in the form of a metallic cylindrical extension of the galvanometer shaft having circumferentially spaced "fingers." The rotor is disposed within a concentric tubular plate, which is divided into a multiplicity of electrically separate stator elements symmetrically disposed about its circumference. Rotation of the shaft changes the relative capacitance between the rotor fingers and the elements. This design has substantial sensitivity to rotational motion, and thus has a high signal output per unit of rotation, but is defective in that it is also as sensitive to unintended radial motion.

Another design is a planar design, with a lobed dielectric rotor or "butterfly" extending in a plane perpendicular to the axis of rotation, and interposed between two parallel metal plates, one an excitation electrode; the other, which is divided into a multiplicity of sensing sectors, serves as a signal plate. Rotation of the rotor changes the relative capacitance between the excitation electrode and individual sensing sections. This design avoids the sensitivity to radial motion from which the first design suffers, but substitutes sensitivity to axial motion.

Furthermore, for equivalent sensitivity, the planar design has a substantially greater moment of inertia, and so has a poor figure of merit. Both of these prior designs suffer from undesirable parasitic current paths to ground, which both waste excitation power and produce unnecessary noise in the system. They also require that the rotor be grounded to the stator and that the stator be isolated from earth ground by the galvanometer user.

What is needed is a position detector that limits excitation loss and also has a relatively low moment of inertia.

SUMMARY OF THE INVENTION

The novel design of the present invention combines the moving-dielectric of the planar design with the concentric geometry of the earlier moving-metal design. A central cylindrical pin, fixed to the stationary part of the galvanometer, acts as an excitation "plate." A concentric segmented tubular signal plate, which is fixed to the stationary part of the scanner, acts as a sensing "plate." Mounted to the rotor, and extending into the annular space between the excitation pin and the segmented tubular signal plate is a lobed cylindrical dielectric. This geometry has an area and spacing, and thus a sensitivity, comparable with the planar geometry, but because the dielectric is arranged in a tubular shape rather than a planar shape, its radius is much smaller than the average radius of an equivalent butterfly shaped dielectric, and so the corresponding moment of inertia is less. This results in a substantial improvement in the figure of merit.

This sensor geometry also provides considerable advantage with respect to the excitation efficiency. By virtue of the cylindrical geometry, the oscillator excites a volume almost fully enclosed by the sensor, so that little of the excitation energy is lost; the radiated RF energy is greatly reduced as well.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
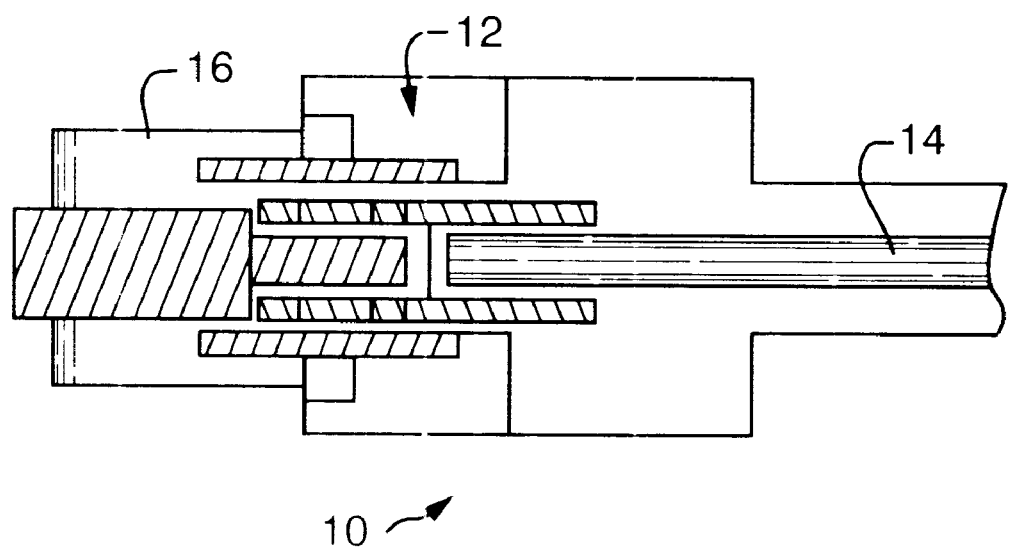
FIG. 1 shows a rotational device such as a moving magnet galvanometer, which incorporates therein the capacitive transducer position detector of the present invention.

Referring now to FIG. 1, a rotational device such as a moving magnet galvanometer 10 is depicted, which incorporates a variable-capacitive transducer position detector 12 ('position detector') of the present invention. More specifically, the galvanometer 10 includes a rotatable shaft or shaft assembly 14 mounted within a stator 16.

Figure 2:
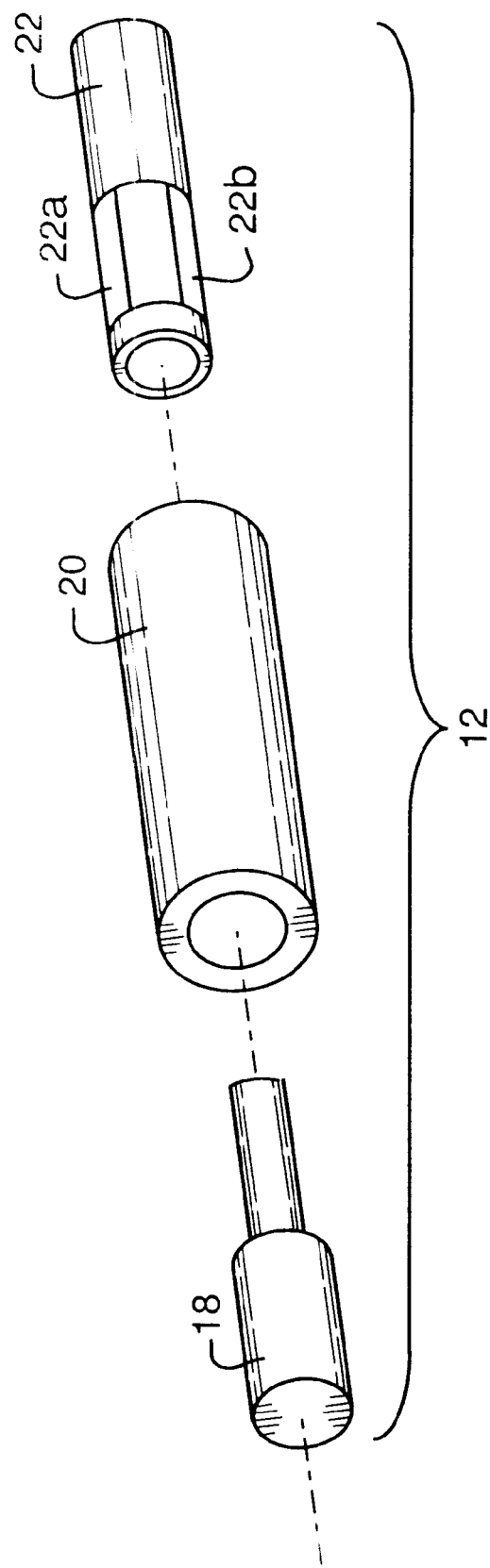
FIG. 2 shows an exploded view of a capacitive transducer position detector of the present invention.
Figure 3:
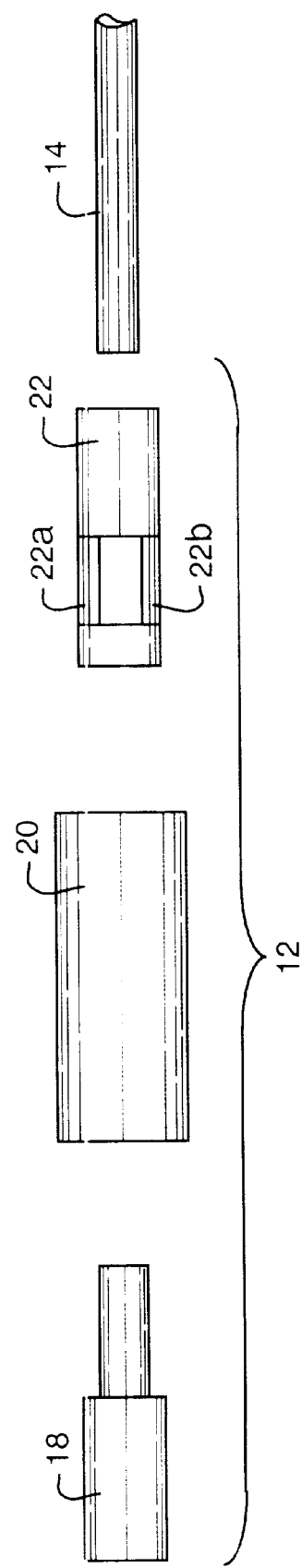
FIG. 3 shows a side view of the embodiment of FIG. 2.
Figure 4:
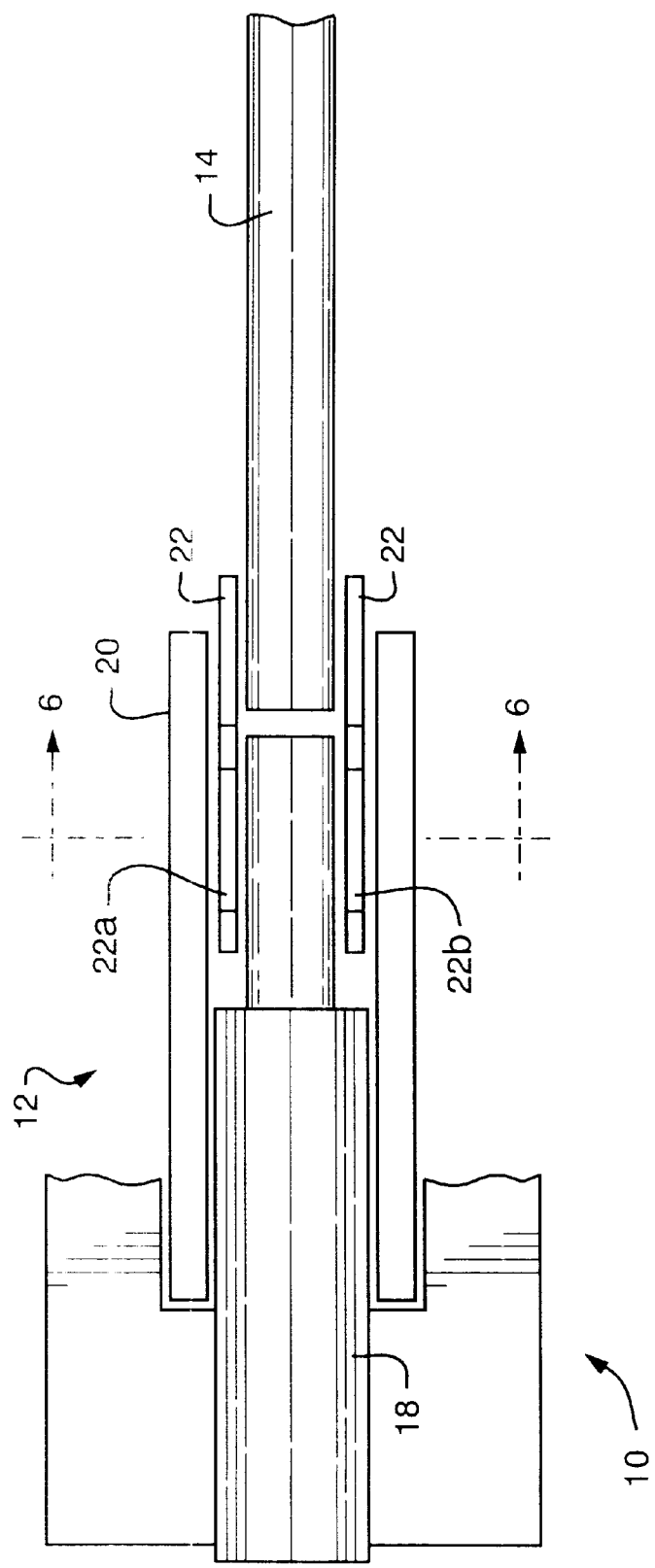
FIG. 4 shows an assembled sectional view of the embodiment of FIGS. 2 and 3.

The various components of position detector 12 are shown in greater detail in FIGS. 2–4. A cylindrical pin 18, fixed to a stationary part of galvanometer 10, acts as an excitation electrode. A concentric segmented tubular electrode 20, having sectors 20a–20d (FIG. 6) and also fixed to a stationary part of galvanometer 10, acts as a signal plate. Mounted to shaft assembly 14 is a lobed dielectric cylinder 22, having lobes 22a and 22b (FIGS. 2, 4 and 6) that extends into an annular space created between the excitation electrode 18 and segmented tubular signal plate 20.

An electrical circuit, as described in my copending patent application titled VARIABLE REACTANCE POSITION DETECTOR, Ser. No. 09/475,960 filed on the same date as the present application, is attached to the position detector 12 such that the electrical circuit calculates the relative angular position of the shaft based on the amount of energy sensed at each of the sensing surfaces of the segmented tubular plate 20. In addition, the electrical circuit is connected to a source of electric energy, such as a crystal oscillator, which regulates the amount of energy applied to cylindrical pin 18.

As previously discussed, the geometry of the present invention has an area and spacing and thus a sensitivity comparable with the prior art planar geometry position detectors, but because the dielectric medium is arranged in tubular form rather than planar form, its radius is substantially smaller than the average radius of an equivalent planar type dielectric; its moment of inertia is therefore less than that of the planar rotor.

Reducing the density of the dielectric further reduces the moment of inertia. Therefore, a variety of commercially available dielectric materials, such as Kynar® plastic or Macor® glass, which have a lower density than the prior art aluminum-oxide ceramic, yet have equivalent dielectric constants, may be used.

Figure 5:
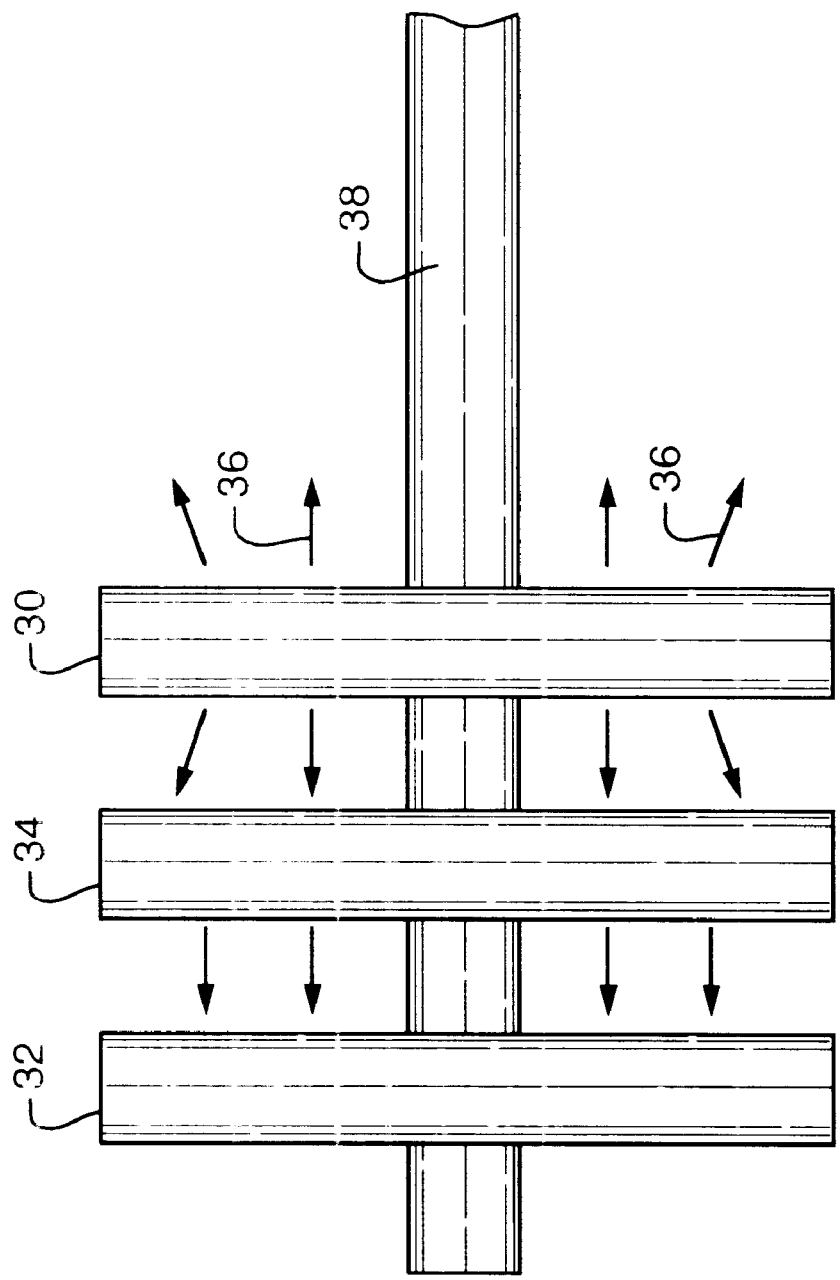
FIG. 5 shows a side view of a prior art planar design position detector.

In addition to improvements in the figure of merit, the geometry of position detector 12 also provides an increase in power efficiency. By virtue of its cylindrical geometry, the pin 18 excites a volume almost fully enclosed by the concentric signal plate 20, so that little of the excitation energy is lost. As shown in FIG. 5, a prior art planar position detector comprises an excitation plate 30, a signal plate 32 and a dielectric stator 34. As shown in FIG. 5. loss of excitation energy, as represented by arrows 36, results in these types of position detectors.

Figure 6:
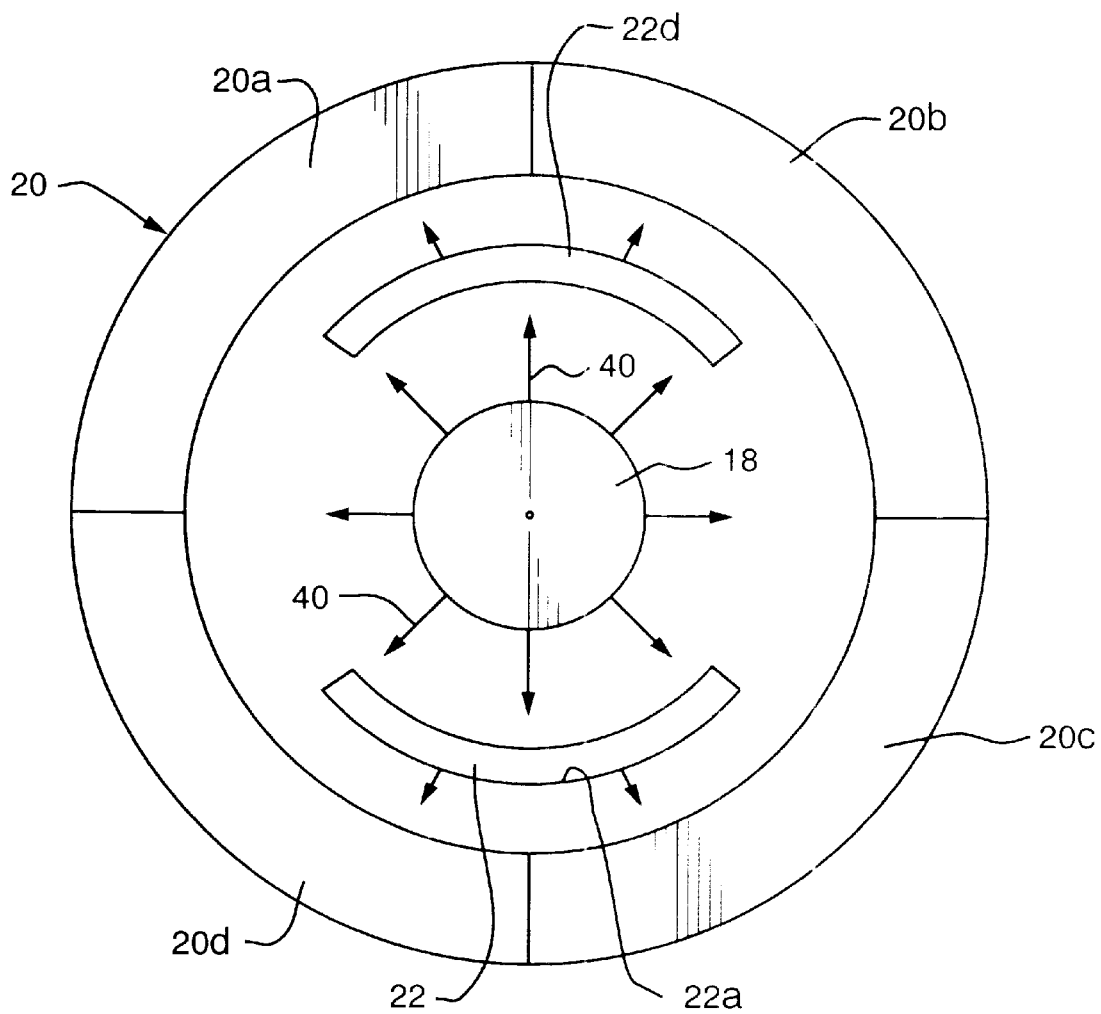
FIG. 6 is a cross section of the position detector of FIGS. 2–4 taken at A—A.

In FIG. 6, the excitation energy of the present invention position detector 12 is represented by arrows 40. The excitation energy is directed outward from cylindrical pin 18 through and past lobed cylindrical dielectric 22 to the concentric segmented tubular plate 20. Thus, almost all of excitation energy is contained within position detector 12. This provides a substantial improvement in the excitation efficiency over the prior art.

Lastly, the geometry of the present invention eliminates the requirement that the rotor be well grounded. The geometry of prior art position detectors, such as that shown in FIG. 5, positions the rotor, which is conductive, in close proximity to the sensing plates. This causes substantial noise coupling, unless the rotor is grounded. The geometry of the present invention allows a greater distance between the conductive rotor and the sensing plates, which substantially limits noise coupling. Therefore, the need for a pig-tail ground or slip ring is eliminated, reducing cost and removing a source of mechanical and electrical noise, and reducing parasitic moments of inertia. This also allows the position detector to be decoupled from the chassis ground, thereby allowing the user more freedom in mounting the system.

What is claimed is:

1. A capacitive sensing system for detecting the angular position of a rotatable member of a motor comprising:
   (a) a motor having a rotor comprising:
      1. an armature; and
      2. a shaft extending from the armature;
   (b) a stator having a housing;
   (c) a cylindrical pin fixedly attached to the housing and connected to a source of oscillating electric energy;
   (d) a segmented tubular plate, having a plurality of sensing surfaces on an interior surface of the plate, fixedly attached to the housing and arranged to surround the cylindrical pin, thereby creating an annular space between the cylindrical pin and the segmented tubular plate; and
   (e) a lobed dielectric, affixed to an end of the shaft remote from the armature, said lobed dielectric residing in the annular space between the cylindrical pin and the tubular plate, whereby rotation of the armature changes the relative capacitances between the pin and the respective sensing surfaces.

2. The capacitive sensing system as defined in claim 1 wherein the lobed dielectric is tubular and comprises first and second ends, said first end being adapted for connecting to the shaft and said second end comprising a plurality of lobes, wherein said lobes modulate electric fields between the cylindrical pin and the segmented tubular plate sensing surfaces.

3. The capacitive sensing system as defined in claim 2 in which the lobed dielectric is fabricated from kynar plastic.

4. The capacitive sensing system as defined in claim 2 wherein the lobed dielectric is fabricated from an aluminum oxide ceramic.

5. The capacitate sensing system as defined in claim 2 wherein an electrical circuit is attached to the sensing surfaces of the segmented tubular plate such that the electrical circuit responds to the relative angular position of the shaft based on the amount of energy simultaneously received at each of the sensing surfaces.

6. The capacitive sensing system as defined in claim 5 wherein the electrical circuit is connected to a source of oscillating electric energy and wherein the electrical circuit controls the amount of energy applied to said cylindrical pin.

7. The capacitive sensing system as defined in claim 6 wherein the electrical circuit calculates the sum of the energy sensed at the sensing surfaces of the segmented tubular plate.

8. The capacitive sensing system as defined in claim 7 wherein the electrical circuit utilizes the sum of energy sensed at the sensing surfaces of the segmented tubular plate to control the amount of energy supplied to said cylindrical pin by the source of oscillating electric energy.

9. The capacitive sensing system as defined in claim 1 wherein the source of oscillating electric energy comprises a crystal oscillator.

10. The capacitive sensing system as defined in claim 1 wherein the lobed dielectric is fabricated from plastic.

11. The capacitive sensing system as defined in claim 1 wherein the lobed dielectric is fabricated from a ceramic material.

* * * * *